(12) United States Patent
Kato et al.

(10) Patent No.: US 12,399,142 B2
(45) Date of Patent: Aug. 26, 2025

(54) SCATTER DIAGRAM DISPLAY DEVICE, SCATTER DIAGRAM DISPLAY METHOD, AND ANALYZER

(71) Applicant: JEOL Ltd., Tokyo (JP)

(72) Inventors: Naoki Kato, Tokyo (JP); Takashi Kimura, Tokyo (JP); Kazunori Tsukamoto, Tokyo (JP)

(73) Assignee: JEOL Ltd., Tokyo (JP)

( * ) Notice: Subject to any disclaimer, the term of this patent is extended or adjusted under 35 U.S.C. 154(b) by 469 days.

(21) Appl. No.: 17/941,540

(22) Filed: Sep. 9, 2022

(65) Prior Publication Data

US 2023/0083479 A1    Mar. 16, 2023

(30) Foreign Application Priority Data

Sep. 10, 2021   (JP) ................................. 2021-147538

(51) Int. Cl.
*G01N 23/2252* (2018.01)

(52) U.S. Cl.
CPC ... *G01N 23/2252* (2013.01); *G01N 2223/402* (2013.01); *G01N 2223/605* (2013.01)

(58) Field of Classification Search
None
See application file for complete search history.

(56) References Cited

U.S. PATENT DOCUMENTS

2003/0193026 A1*  10/2003  Takagi ............... G01N 23/2251
                                                                    250/311
2016/0110896 A1*   4/2016  Mori .................... G01N 23/225
                                                                    345/637

FOREIGN PATENT DOCUMENTS

JP       2011153858 A   *  8/2011
JP         201680575 A      5/2016

OTHER PUBLICATIONS

Extended European Search Report issued in EP22192172.9 on Feb. 7, 2023.
Yan et al., A Work-Centered Visual Analytics Model to Support Engineering Design with Interactive Visualization and Data-mining, IEEE Computer Society, 45th Hawaii International Conference on System Sciences, 2012, pp. 1845-1854.

* cited by examiner

*Primary Examiner* — James Choi
(74) *Attorney, Agent, or Firm* — The Webb Law Firm

(57) ABSTRACT

Provided is a scatter diagram display device that creates a plurality of scatter diagrams based on mapping data acquired by an analyzer and displays a scatter diagram matrix in which the created plurality of scatter diagrams are arranged in a matrix on a display section, the scatter diagram display device including: a display condition acceptance section that accepts a designation of a display range of an item in each of the plurality of scatter diagrams, and a display control section that extracts all scatter diagrams having the item whose display range has been designated from the plurality of scatter diagrams and changes the display range of the item in the extracted scatter diagrams based on the designation of the display range.

11 Claims, 13 Drawing Sheets

SCATTER DIAGRAM DISPLAY DEVICE, SCATTER DIAGRAM DISPLAY METHOD, AND ANALYZER

CROSS-REFERENCE TO RELATED APPLICATION

This application claims priority to Japanese Patent Application No. 2021-147538, filed Sep. 10, 2021, the disclosure of which is hereby incorporated by reference in its entirety.

BACKGROUND OF THE INVENTION

Field of the Invention

The present invention relates to a scatter diagram display device, a scatter diagram display method, and an analyzer.

Description of Related Art

Phase analysis has been known as a method for analyzing element mapping (detection intensity or concentration distribution data for each element) acquired by a surface analyzer such as an electron probe microanalyzer (EPMA). Phase analysis is a method for extracting the phases of a compound from the correlation relationship between a plurality of elements and examining the correlation for each phase.

In phase analysis, when a large number of elements are included in a specimen, the analyst needs to determine a combination of elements for which the phase analysis is to be performed. For this purpose, a method is used in which scatter diagrams created by combining two different elements are arranged in a matrix to create a scatter diagram matrix which is displayed so that the correlation between a plurality of elements can be easily understood.

For example, JP-A-2016-80575 discloses a scatter diagram display device in which scatter diagrams are arranged by prioritizing the elements based on the results of principal component analysis, thereby making it possible to display a plurality of scatter diagrams so that the correlation between the elements can be easily understood.

In a scatter diagram matrix, changing the display ranges of scatter diagrams constituting the scatter diagram matrix enables the display such that the correlation between the elements can be easily understood. For example, when comparing two specimens, two scatter diagram matrices are displayed side by side. At this time, visual comparison is facilitated by aligning the display ranges of the scatter diagrams in the two scatter diagram matrices.

SUMMARY OF THE INVENTION

According to the first aspect of the invention, there is provided a scatter diagram display device that creates a plurality of scatter diagrams based on mapping data acquired by an analyzer and displays a scatter diagram matrix in which the created plurality of scatter diagrams is arranged in a matrix on a display section, the scatter diagram display device including:
  a display condition acceptance section that accepts a designation of a display range of an item in each of the plurality of scatter diagrams; and
  a display control section that extracts all scatter diagrams having the item whose display range has been designated from the plurality of scatter diagrams and changes the display range of the item of the extracted scatter diagrams based on the designation of the display range.

According to the second aspect of the invention, there is provided a scatter diagram display method for creating a plurality of scatter diagrams based on mapping data acquired by an analyzer and displaying a scatter diagram matrix in which the created plurality of scatter diagrams is arranged in a matrix on a display section, the scatter diagram display method including:
  accepting a designation of a display range of an item in each of the plurality of scatter diagrams; and
  extracting all scatter diagrams having the item whose display range has been designated from the plurality of scatter diagrams and changing the display range of the item in the extracted scatter diagrams based on the designation of the display range.

According to the third aspect of the invention, there is provided an analyzer comprising the above scatter diagram display device.

BRIEF DESCRIPTION THE DRAWINGS

DESCRIPTION OF THE INVENTION

According to an embodiment of the invention, there is provided a scatter diagram display device that creates a plurality of scatter diagrams based on mapping data acquired by an analyzer and displays a scatter diagram matrix in which the created plurality of scatter diagrams is arranged in a matrix on a display section, the scatter diagram display device including:
  a display condition acceptance section that accepts a designation of a display range of an item in each of the plurality of scatter diagrams; and
  a display control section that extracts all scatter diagrams having the item whose display range has been desig- nated from the plurality of scatter diagrams and changes the display range of the item of the extracted scatter diagrams based on the designation of the display range.

With such a scatter diagram display device, the display ranges of the scatter diagrams constituting the scatter diagram matrix can be easily changed. Further, since the display control section extracts all the scatter diagrams for which the display range has been designated from the plurality of scatter diagrams, by designating the display range of one item, it is possible to change collectively the display ranges of all the scatter diagrams including the item.

According to an embodiment of the invention, there is provided a scatter diagram display method for creating a plurality of scatter diagrams based on mapping data acquired by an analyzer and displaying a scatter diagram matrix in which the created plurality of scatter diagrams is arranged in a matrix on a display section, the scatter diagram display method including:

accepting a designation of a display range of an item in each of the plurality of scatter diagrams; and extracting all scatter diagrams having the item whose display range has been designated from the plurality of scatter diagrams and changing the display range of the item in the extracted scatter diagrams based on the designation of the display range.

With such a scatter diagram display method, the display ranges of the scatter diagrams constituting the scatter diagram matrix can be easily changed. Further, since the display control section extracts all the scatter diagrams for which the display ranges have been designated from the plurality of scatter diagrams, by designating the display range of one item, it is possible to change collectively the display ranges of all the scatter diagrams including the item.

According to an embodiment of the invention, there is provided an analyzer including the above scatter diagram display device.

Preferred embodiments of the invention are described in detail below with reference to the drawings. It is noted that the following embodiments do not unduly limit the scope of the invention as stated in the claims. In addition, all of the components described in the following embodiments are not necessarily essential requirements of the invention.

1. SCATTER DIAGRAM DISPLAY DEVICE

Figure 1:
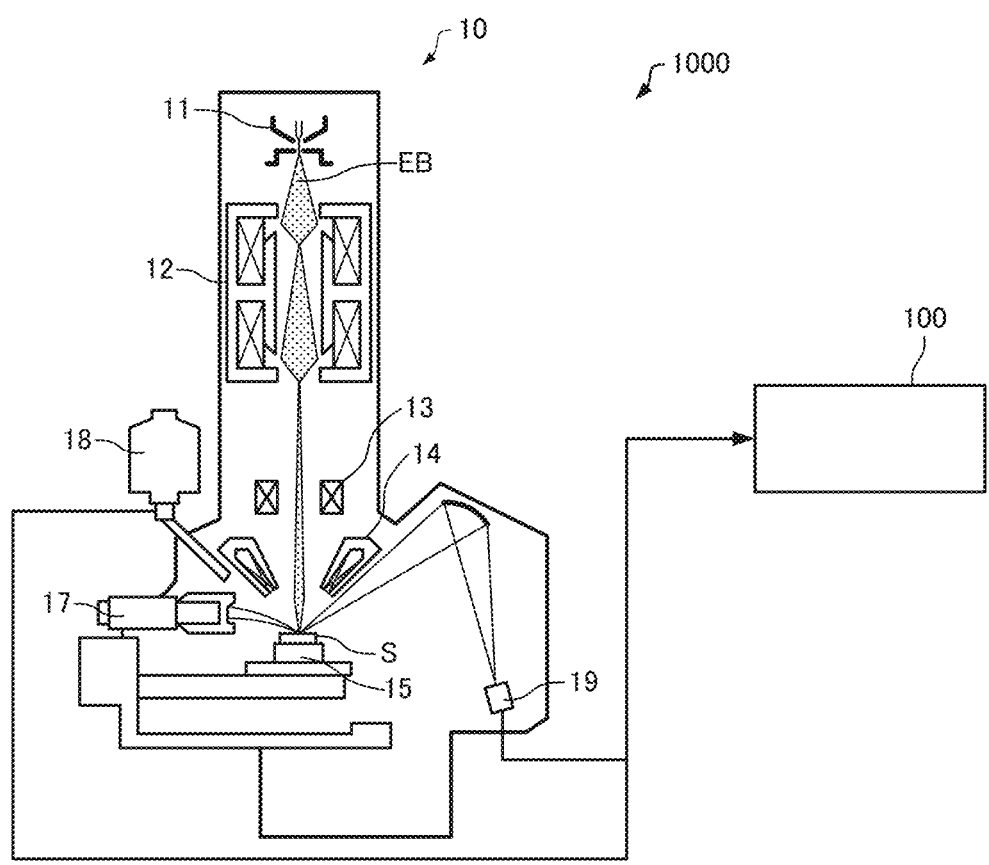
FIG. 1 is a diagram illustrating a configuration of a surface analyzer.

First, a scatter diagram display device according to an embodiment of the invention will be described with reference to the drawings. FIG. 1 is a diagram illustrating a configuration of a surface analyzer 1000 including a scatter diagram display device 100 according to an embodiment of the invention.

As illustrated in FIG. 1, the surface analyzer 1000 includes an analyzer main body 10 and the scatter diagram display device 100.

The surface analyzer 1000 irradiates a specimen S with an electron beam EB, detects characteristic X-rays generated from the specimen S in response to the irradiation with the electron beam EB, and qualitatively or quantitatively analyzes the elements contained in the specimen S. Further, the surface analyzer 1000 can perform mapping analysis (mapping analysis) on the specimen S. The surface analyzer 1000 is, for example, an electron probe microanalyzer (EPMA).

(1) Analyzer Main Body

The analyzer main body 10 includes an electron gun 11, a focusing lens 12, a deflector 13, an objective lens 14, a specimen stage 15, a secondary electron detector 17, an energy dispersive detector 18, and a wavelength dispersive detector 19.

The electron gun 11 generates the electron beam EB. The electron gun 11 emits the electron beam EB accelerated by a predetermined acceleration voltage toward the specimen S.

The focusing lens 12 focuses the electron beam EB. The deflector 13 deflects the electron beam EB. The objective lens 14 focuses the electron beam EB on the specimen S to form an electron probe. By converging the electron beam EB with the focusing lens 12 and the objective lens 14 to form an electron probe and deflecting the electron beam EB with the deflector 13, the specimen S can be scanned by the electron probe.

The specimen stage 15 holds the specimen S. The specimen S is placed on the specimen stage 15. The specimen stage 15 has a moving mechanism for moving the specimen S. By moving the specimen S at the specimen stage 15, the position (analysis position) irradiated with the electron beam EB (electron probe) can be changed.

The secondary electron detector 17 is for detecting the secondary electrons emitted from the specimen S. A secondary electron image can be obtained from the measurement result (output signal) of the secondary electron detector 17. The output signal of the secondary electron detector 17 is stored in, for example, a storage section of the scatter diagram display device 100 as image data synchronized with the scanning signal of the electron beam EB.

The energy dispersive detector 18 is for discriminating X-rays by energy and obtaining a spectrum. The energy dispersive detector 18 detects the characteristic X-rays emitted from the specimen S under the irradiation of the specimen S with the electron beam EB.

The wavelength dispersive detector 19 separates and detects the characteristic X-rays emitted from the specimen S under the irradiation of the specimen S with the electron beam EB. The wavelength dispersive detector 19 separates X-rays of a specific wavelength by utilizing, for example, Bragg reflection of X-rays by a spectral crystal. The wavelength dispersive detector 19 is, for example, a wavelength-dispersive X-ray spectrometer (WDS).

The analyzer main body 10 can perform mapping analysis (surface analysis) of the specimen S. Specifically, in the analyzer main body 10, element mapping data can be obtained by dividing the designated range of the specimen S into predetermined pixels (unit areas) and measuring the X-ray intensity of each pixel by the energy dispersive detector 18 or the wavelength dispersive detector 19.

The element mapping data include information on two-dimensional distribution of elements and include information on two-dimensional positions (coordinates) and X-ray intensity (or element concentration) at each position. Element mapping data are obtained for each element. For example, the element mapping data of an element a are data including information on the two-dimensional distribution of the element a and include information on the position and X-ray intensity (or the concentration of the element a) of the element a at each position. The element mapping data output from the analyzer main body 10 are stored in the storage section 124 of the scatter diagram display device 100.

(2) Scatter Diagram Display Device

The scatter diagram display device 100 acquires the element mapping data obtained by the mapping analysis in the analyzer main body 10, performs the principal component analysis on the acquired element mapping data, prioritizes the elements based on the result of the principal component analysis, arranges the scatter diagrams based on the priority, and displays the arranged scatter diagrams on the display section 122.

Figure 2:
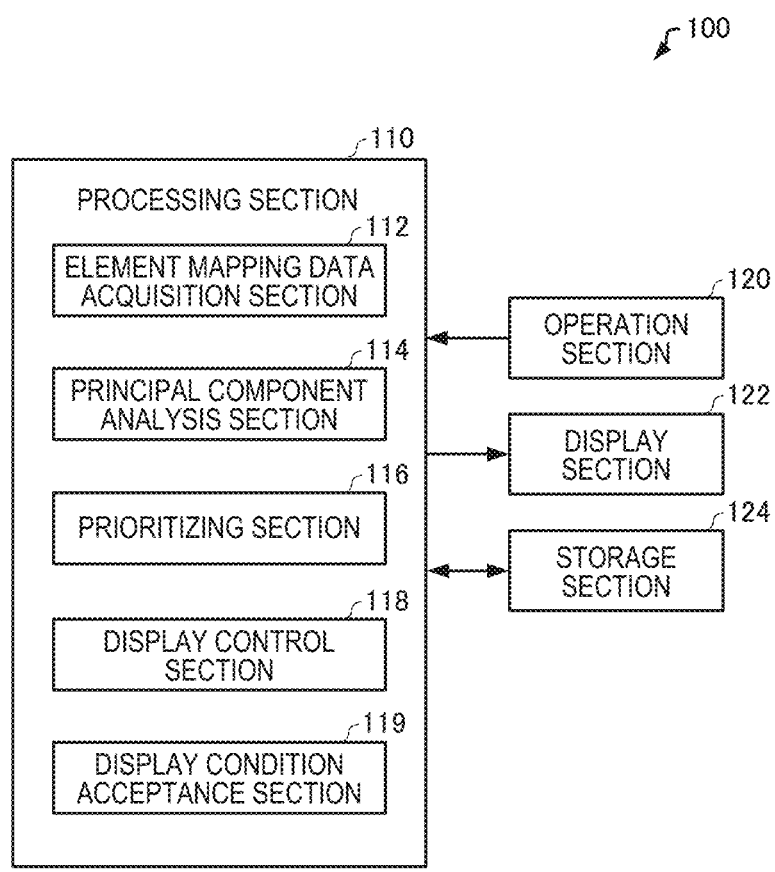
FIG. 2 is a diagram illustrating a configuration of a scatter diagram display device.

FIG. 2 is a diagram illustrating a configuration of the scatter diagram display device 100. As illustrated in FIG. 2, the scatter diagram display device 100 includes a processing section 110, an operation section 120, a display section 122, and a storage section 124.

The operation section 120 is for the user to input operation information, and outputs the input operation information to the processing section 110. The function of the operation section 120 can be realized by an input device such as a keyboard, a mouse, a button, a touch panel, and a touch pad.

The display section 122 displays the image generated by the processing section 110, and the function thereof can be realized by a display such as an LCD or a CRT. The display section 122 can display, for example, a scatter diagram matrix created by the processing section 110 (display control section 118). Further, the display section 122 can display, for example, a secondary electron image, an element map, or the like.

The storage section 124 stores programs and various data for causing the computer to function as each section of the processing section 110. The storage section 124 also functions as a work area of the processing section 110. The functions of the storage section 124 can be realized by a hard disk, RAM (Random Access Memory), or the like.

As a result of executing the program stored in the storage section 124, the processing section 110 functions as an element mapping data acquisition section 112, a principal component analysis section 114, a prioritizing section 116, a display control section 118, and a display condition acceptance section 119 that will be described hereinbelow. The functions of the processing section 110 can be realized by executing the program on hardware such as various processors (CPU, DSP, etc.) and ASIC (gate array, etc.). In addition, at least a part of the processing section 110 may be realized by hardware (dedicated circuit). The processing section 110 includes the element mapping data acquisition section 112, the principal component analysis section 114, the prioritizing section 116, the display control section 118, and the display condition acceptance section 119.

The element mapping data acquisition section 112 acquires a plurality of element mapping data. For example, the element mapping data acquisition section 112 acquires information on the element mapping data obtained by the mapping analysis in the analyzer main body 10. The element mapping data acquisition section 112 may acquire information on a plurality of element mapping data selected by the user from the element mapping data obtained by the mapping analysis in the analyzer main body 10. The element mapping data obtained by the mapping analysis in the analyzer main body 10 is stored in the storage section 124, and the element mapping data acquisition section 112 reads the element mapping data from the storage section 124.

The principal component analysis section 114 performs principal component analysis on a plurality of element mapping data acquired by the element mapping data acquisition section 112.

Here, the principal component analysis is one of multivariate analysis methods and obtains a small number of characteristic variates (synthetic variate) representing the characteristics of a data group from multivariate data. A synthetic variate (principal component) u is represented by a following formula (1).

$$u_i = a_1 x_{1,i} + a_2 x_{2,i} + \ldots + a_{N-1} x_{N-1,i} + a_N x_{N,i} \quad (1)$$

Here, N is the number of variates, i is a natural number, x is the data of each variate, and $a_1, a_2 \ldots a_{N-1}, a_N$ are the coefficients (principal component coefficients) of synthetic variates.

The coefficients (principal component coefficients) $a_1, a_2 \ldots a_{N-1}, a_N$ of synthetic variates are obtained so that the dispersion of the synthetic variate u is maximized. The coefficients (principal component coefficients) of synthetic variates satisfy the following relationship.

$$a_1^2 + a_2^2 + \ldots + a_{N-1}^2 + a_N^2 = 1$$

In order to obtain the coefficients (principal component coefficients) $a_1, a_2 \ldots a_{N-1}, a_N$ of synthetic variates, first, a dispersion/covariance matrix of the original data group is calculated, and the eigenvalue problem of the dispersion/covariance matrix is solved. An eigenvalue vector, which is the solution of the eigenvalue problem, corresponds to the coefficients $a_1, a_2 \ldots a_{N-1}, a_N$. Further, the obtained principal components are N sets (the same as the number of the original data groups), and are called the first principal component, the second principal component . . . the N-th principal component starting from the one having the largest eigenvalue.

The principal component analysis section 114 performs principal component analysis with respect to the data (intensity values or density values) of all pixels of the plurality of element mapping data acquired by the element mapping data acquisition section 112 and obtains the principal component coefficient of the first principal component and the principal component coefficient of the second principal component.

The prioritizing section 116 prioritizes the elements based on the result of the principal component analysis in the principal component analysis section 114. In the prioritizing section 116, the element having the largest absolute value of the principal component coefficient of the first principal component is set as the element having the highest priority, and the element having the largest absolute value of the principal component coefficient of the second principal component is set as the element having the second highest priority.

For example, the prioritizing section 116 sets the element having the second largest absolute value of the principal component coefficient of the first principal component as the element having the third highest priority, excluding the element having the second highest priority, and sets the element having the third largest absolute value of the principal component coefficient of the first principal component as the element having the fourth highest priority. In the same manner, the fifth highest and subsequent priorities are determined in decreasing order of the principal component coefficient of the first principal component.

The display control section 118 arranges a plurality of scatter diagrams, which have been created by combining the elements, based on the priority assigned to each element by the prioritizing section 116 and displays the scatter diagrams on the display section 122. The display control section 118, for example, arranges the plurality of scatter diagrams, which have been created by combining the elements, in a matrix based on the priority to create a scatter diagram matrix.

Figure 3:
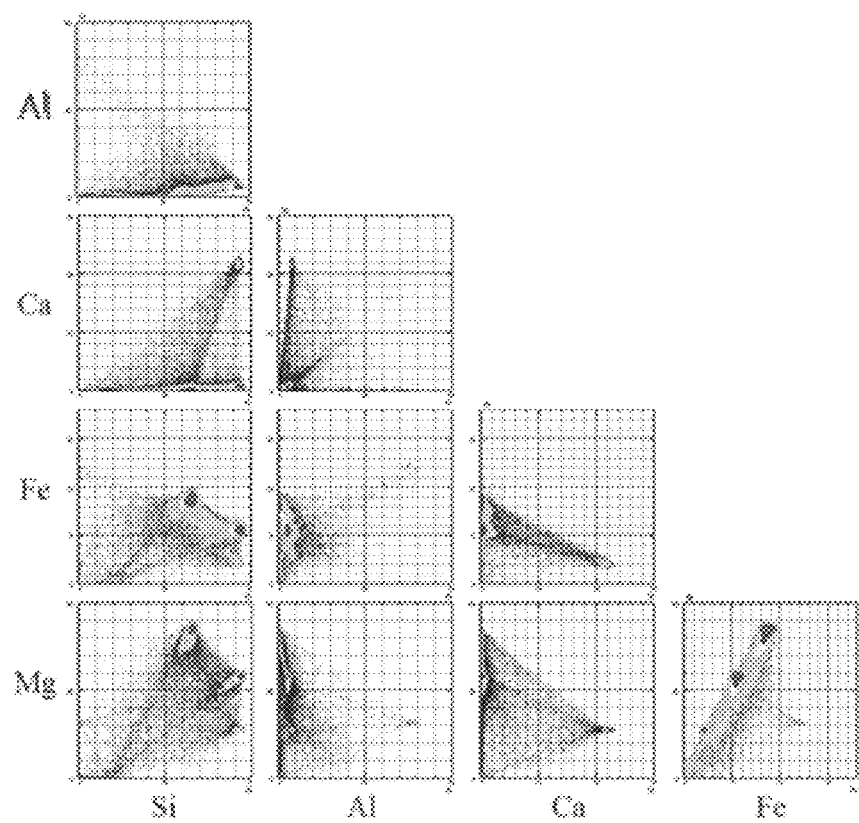
FIG. 3 illustrates an example of a scatter diagram matrix.

FIG. 3 illustrates an example of a scatter diagram matrix. As illustrated in FIG. 3, in the scatter diagram matrix, scatter diagrams created by combining two different elements are arranged in a matrix.

Figure 4:
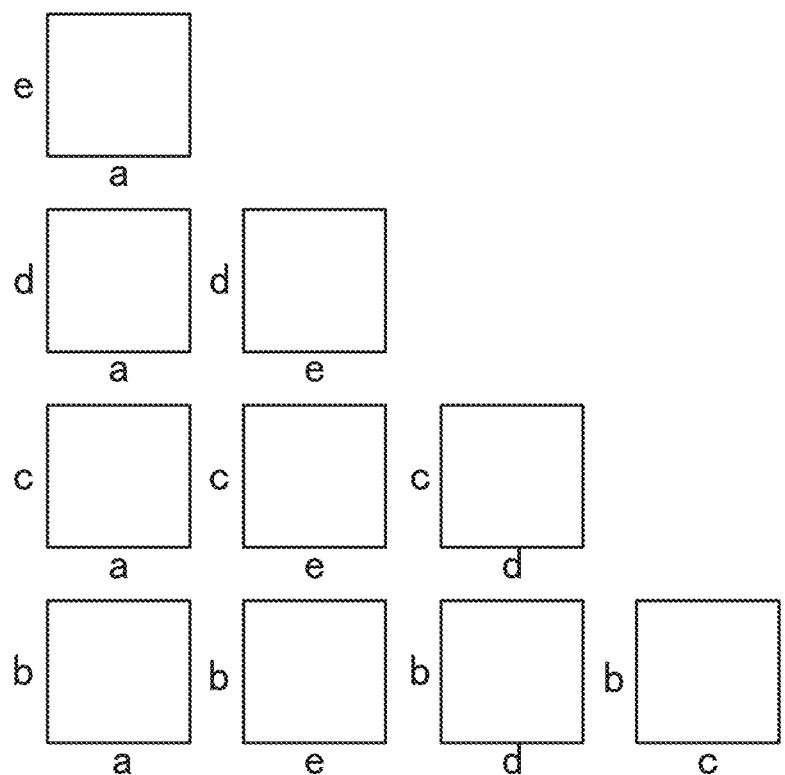
FIG. 4 is a diagram for explaining a scatter diagram matrix.

FIG. 4 is a diagram for explaining a scatter diagram matrix. In FIG. 4, each scatter diagram is illustrated in a simplified form.

In the example illustrated in FIG. 4, scatter diagrams created by combining two of the elements a, b, c, d, and e are arranged. In the example illustrated in FIG. 2, the scatter diagrams arranged in the vertical direction have the same element on the horizontal axis, and the scatter diagrams arranged in the horizontal direction have the same element on the vertical axis.

The display control section 118 arranges a scatter diagram ((a, b) scatter diagram) created by combining an element having the highest priority (for example, element a) and an element having the second highest priority (for example, element b) at the corner of the scatter diagram matrix. Next, the scatter diagrams ((a, c) scatter diagram, (a, d) scatter diagram, (a, e) scatter diagram) created by combining the element having the highest priority and elements having the third highest priority and lower priorities (c, d, e) are arranged in the vertical direction from the corner in descending order of priority.

Next, the display control section 118 arranges the scatter diagrams ((b, c) scatter diagram, (b, d) scatter diagram, and (b, e) scatter diagram) created by combining the element having the second highest priority and elements having the third highest priority and lower priorities (c, d, e) in the horizontal direction from the end toward the corner in descending order of priority. In such a manner, the arrangement of the remaining scatter diagrams ((c, d) scatter diagram, (c, e) scatter diagram, (d, e) scatter diagram) can also be determined and a scatter diagram matrix can be created.

Figure 5:
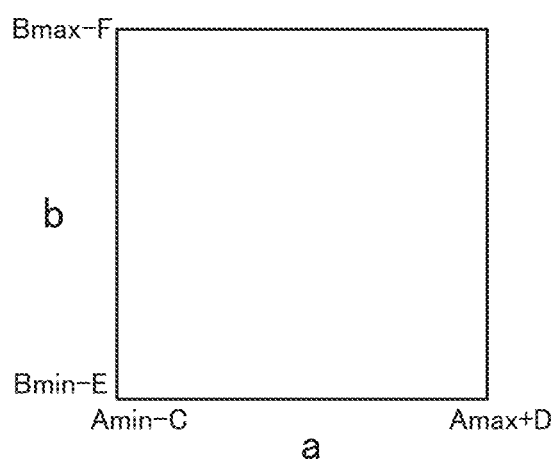
FIG. 5 is a diagram for explaining a scatter diagram.

FIG. 5 is a diagram for explaining the (a, b) scatter diagram.

The display control section 118 determines the display range of each item (axis) in the scatter diagram based on the maximum value and minimum value of signal intensity of the mapping data. The display control section 118 determines the display range of the scatter diagram by taking the maximum value of the signal intensity of the mapping data of the element a or a value larger than the maximum value as the upper limit of the display range of the axis of the element a in the scatter diagram and taking the minimum value of the signal intensity of the mapping data of the element a or a value smaller than the minimum value as the lower limit of the display range of the axis of the element a in the scatter diagram. Similarly, for the other axis of the scatter diagram, the maximum value of the signal intensity of the mapping data or a value larger than the maximum value is taken as the upper limit, and the minimum value of the signal intensity of the mapping data or a value smaller than the minimum value is taken as the lower limit. The mapping data of the element a and the mapping data of the element b can thus be displayed in the scatter diagram.

For example, where the maximum value of the signal intensity is Amax and the minimum value is Amin in the mapping data of the element a, the display range of the axis (horizontal axis) of the element a in the (a, b) scatter diagram is from Amin−C to Amax+D. C and D can be set to arbitrary values. Further, where the maximum value of the signal intensity is Bmax and the minimum value is Bmin in the mapping data of the element b, the display range of the axis (vertical axis) of the element b is from Bmin−E to Bmax+F. E and F can be set to arbitrary values. The display control section 118 also determines the display ranges for other scatter diagrams in a similar manner.

The display control section 118 arranges the scatter diagrams created as described above according to the priority of the elements and displays the scatter diagram matrix on the display section 122.

The display condition acceptance section 119 accepts the designation of the display range of an item in each of the plurality of scatter diagrams constituting the scatter diagram matrix.

Where the display condition acceptance section 119 accepts the designation of the display range of the item, the display control section 118 extracts the scatter diagrams having the item for which the display range has been designated from the plurality of scatter diagrams. Then, the display control section 118 changes the display range of the item of the extracted scatter diagram based on the designation of the display range.

2. SCATTER DIAGRAM DISPLAY METHOD 2.1. Display of Scatter Diagram Matrix

Figures 6, 7:
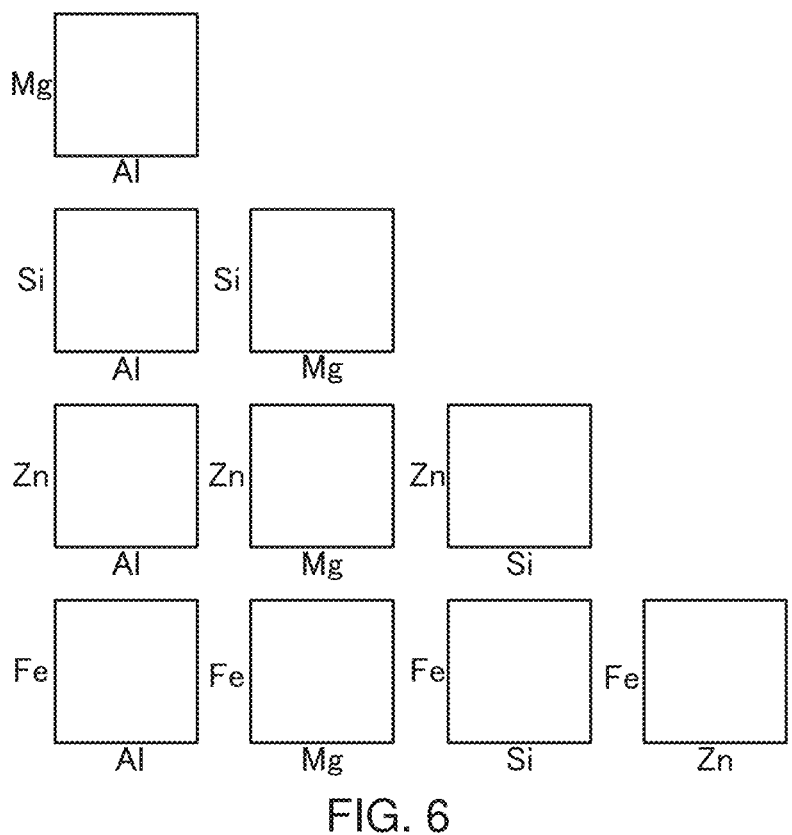
FIG. 6 is a diagram schematically illustrating a scatter diagram matrix.
FIG. 7 illustrates a display range designation dialog.

FIG. 6 is a diagram schematically illustrating a scatter diagram matrix. In the example illustrated in FIG. 6, Al, Fe, Zn, Si, and Mg were ranked in the order of higher priority based on the results of the principal component analysis. The display control section 118 arranges a plurality of scatter diagrams created by combining the elements based on the priority assigned to each element by the prioritizing section 116 and displays the scatter diagrams on the display section 122.

Specifically, the display control section 118 combines Al having the highest priority and Fe having the second highest priority to create a scatter diagram and arranges this scatter diagram ((Al, Fe) scatter diagram) in the lower left corner of the scatter diagram matrix.

Further, the display control section 118 arranges the scatter diagrams ((Al, Zn) scatter diagram, (Al, Si) scatter diagram, (Al, Mg) scatter diagram) created by combining Al having the highest priority and elements (elements Zn, Si, Mg) having the third highest priority and lower priorities in the vertical direction from the corner in descending order of priority. Next, scatter diagrams ((Fe, Zn) scatter diagram, (Fe, Si) scatter diagram, (Fe, Mg) scatter diagram) created by combining Fe having the second highest priority and elements (elements Zn, Si, Mg) having the third highest priority and lower priorities are arranged in the horizontal direction from the end toward the corner in descending order of priority. In this manner, the arrangement of the remaining scatter diagrams ((Zn, Si) scatter diagram, (Zn, Mg) scatter diagram, (Si, Mg) scatter diagram) can be also determined, and a scatter diagram matrix can be created.

At this time, the display control section 118 determines the display range of Al (horizontal axis) of the (Al, Fe) scatter diagram based on the minimum value and the maximum value of signal intensity of the mapping data of Al. Further, the display range of Fe (vertical axis) is determined based on the minimum value and the maximum value of signal intensity of the mapping data of Fe. The display control section 118 also determines the display ranges for other scatter diagrams.

2.2. Change of Display Range (1) Operation of Display Range Designation Dialog

FIG. 7 illustrates a display range designation dialog 2. By using the display range designation dialog 2, the display ranges of each scatter diagram constituting the scatter diagram matrix can be changed.

The display range designation dialog 2 includes a table 210 provided with fields designating a display range for each item of the scatter diagram, and an apply button 220. The table 210 includes item fields 212 and also lower limit fields 214 and upper limit fields 216 for designating a display range.

In the item fields 212, the items of each axis of the scatter diagrams are displayed. In the item field 212, a name for specifying the item is described, and in the illustrated example, the element name and the signal type are described. Here, EDS and WDS are described as signal types.

In the lower limit fields 214, the lower limits of the display ranges of the scatter diagrams are input, and in the upper limit fields 216, the upper limits of the display ranges of the scatter diagrams are input. In the initial state, values based on the minimum value of signal intensity of the mapping data are input to the lower limit fields 214, and values based on the maximum value of signal intensity of the mapping data are input to the upper limit fields 216.

The user can enter arbitrary values in the lower limit fields 214 and the upper limit fields 216. The user operates the operation section 120 to input respective values in the lower limit fields 214 and the upper limit fields 216 and presses the apply button 220 to designate the display ranges.

For example, where "10" is input in the lower limit field 214 of Si WDS, "500" is input in the upper limit field 216, and the apply button 220 is pressed to designate the display range, the display range of Si is changed to "10-500" in the four scatter diagrams having the Si item. Specifically, in the (Si, Fe) scatter diagram and the (Si, Zn) scatter diagram with Si WDS as the horizontal axis, the lower limit on the horizontal axis is changed to "10" and the upper limit on the horizontal axis is changed to "500". Further, in the (Al, Si) scatter diagram and the (Mg, Si) scatter diagram with Si WDS as the vertical axis, the lower limit value on the vertical axis is changed to "10" and the upper limit value on the vertical axis is changed to "500".

Where the display ranges are designated by inputting respective values to the lower limit fields 214 and the upper limit fields 216 for a plurality of items, the display ranges for the designated items are changed for all the scatter diagrams including the designated items.

Information on the display range for each item (element) set in the display range designation dialog 2 is stored in the storage section 124. For example, when the scatter diagram display device 100 is activated, the display control section 118 may read out the information stored in the storage section 124 and reproduce the display range for each item in the table 210 of the display range designation dialog 2.

(2) Processing

Figure 8:
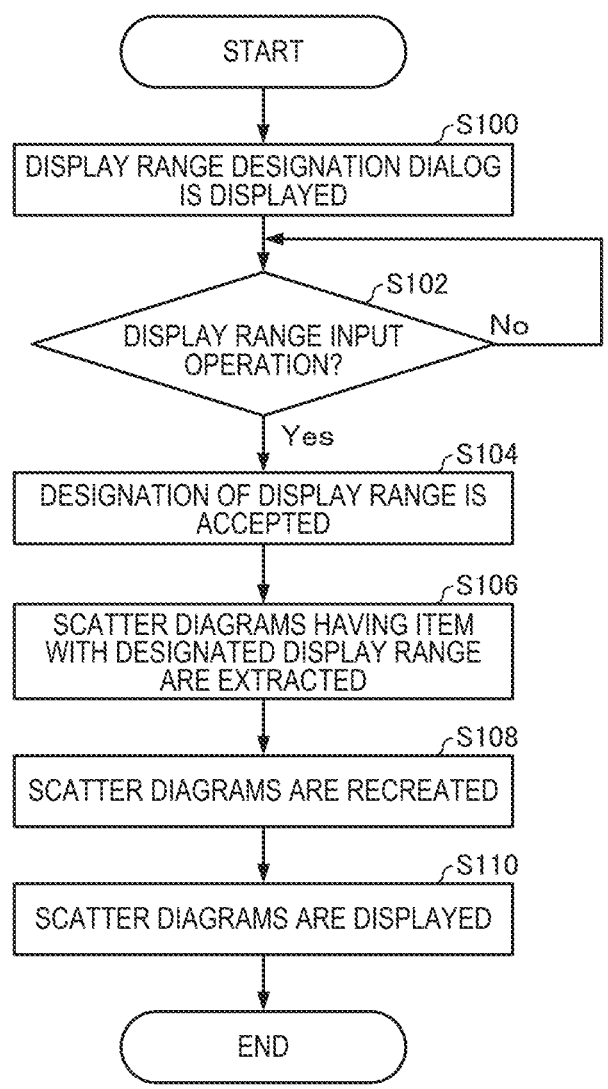
FIG. 8 is a flowchart illustrating an example of display range change processing.

FIG. 8 is a flowchart illustrating an example of display range change processing of the processing section 110 of the scatter diagram display device 100.

The display control section 118 displays the scatter diagram matrix illustrated in FIG. 6 and the display range designation dialog 2 illustrated in FIG. 7 on the display section 122 (S100). At this time, in the display range of each item (element) of the scatter diagrams constituting the scatter diagram matrix, the lower limit value is based on the minimum value of signal intensity of the mapping data of each element, and the upper limit value is based on the maximum value of signal intensity. Further, in the table 210 of the display range designation dialog 2, the minimum value of the display range is shown in the lower limit field 214 and the maximum value of the display range is shown in the upper limit field 216 for each element.

The display condition acceptance section 119 determines whether the user has performed an operation of inputting a display range in the table 210 (S102), and waits until the operation of inputting the display range is performed (No in S102). For example, when values are input to the lower limit field 214 and the upper limit field 216 of each item and the operation of pressing the apply button 220 is performed, it is determined that the operation of inputting the display ranges has been performed.

Where it is determined that the user has performed the operation of inputting the display range (Yes in S102), the display condition acceptance section 119 accepts the designation of the display range of the designated item (S104). The display condition acceptance section 119 acquires, for example, information on the designated display range from the value input in the lower limit fields 214 and the value input in the upper limit fields 216 of the table 210.

The display control section 118 extracts all the scatter diagrams in which the element with the designated range is the item from the scatter diagram matrix (S106). Next, the display control section 118 recreates the scatter diagrams using the mapping data so that the display range of the item of the extracted scatter diagrams is the designated display range (S108).

The display control section 118 replaces the scatter diagrams in the initial state with the recreated scatter diagrams to incorporate into the scatter diagram matrix and displays the scatter diagram matrix on the display section 122 (S110). The processing section 110 ends the display range change processing after the recreated scatter diagrams have been displayed on the display section 122.

(3) Operation Example

As an example of the operation of the scatter diagram display device 100, the operation will be explained in which the user performs the operation of inputting "20" in the lower limit field 214 and "200" in the upper limit field 216 of Al and inputting "30" in the lower limit field 214 and "300" in the upper limit field 216 of Zn in the display range designation dialog 2 in the state where the scatter diagram matrix illustrated in FIG. 6 and the display range designation dialog 2 illustrated in FIG. 7 are displayed.

Where the user's operation is performed, the display condition acceptance section 119 determines that the user has performed the operation of inputting the display ranges and accepts the designation of the Al display range as "20-200" and the designation of the Zn display range as "30-300".

From the scatter diagram matrix, the display control section 118 extracts four scatter diagrams ((Al, Fe) scatter diagram, (Al, Zn) scatter diagram, (Al, Si) scatter diagram, (Al, Mg) scatter diagram) with Al is an item, and four scatter diagrams ((Al, Zn) scatter diagram, (Mg, Zn) scatter diagram, (Si, Zn) scatter diagram, (Zn, Fe) scatter diagram) with Zn as an item.

The display control section 118 changes the horizontal axis of the (Al, Fe) scatter diagram, (Al, Zn) scatter diagram, (Al, Si) scatter diagram, and (Al, Mg) scatter diagram to the range of "20-200". Further, the display control section 118 changes the vertical axis of the (Al, Zn) scatter diagram, (Mg, Zn) scatter diagram, and (Si, Zn) scatter diagram to "30-300", and changes the horizontal axis of the (Zn, Fe) scatter diagram to "30-300". The display control section 118 recreates the scatter diagrams with changed display ranges.

The display control section 118 replaces the extracted scatter diagrams with the recreated scatter diagram and displays the scatter diagram matrix on the display section 122.

By the above processing, the display ranges of the scatter diagrams can be changed.

2.3. Change of Arrangement of Scatter Diagrams

Figure 9:
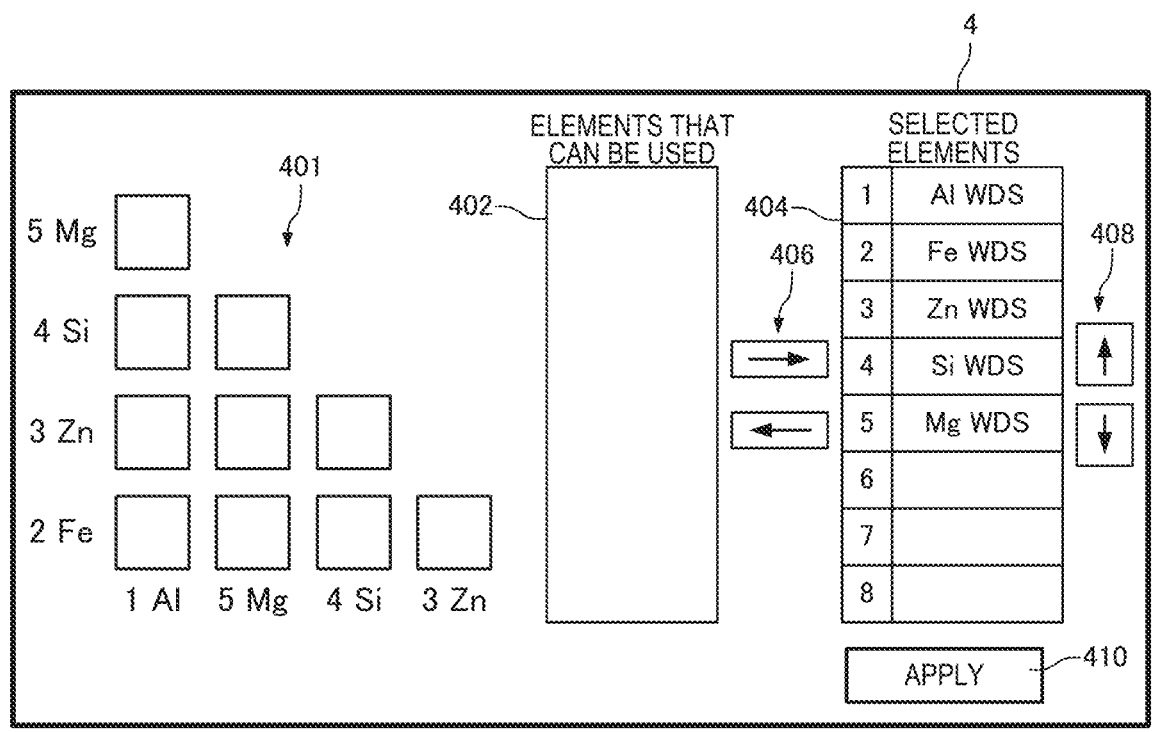
FIG. 9 is a diagram for explaining an element selection dialog.

FIG. 9 is a diagram for explaining an element selection dialog 4.

The element selection dialog 4 is for selecting elements to be items of the scatter diagrams constituting the scatter diagram matrix and designating the arrangement of the scatter diagrams in the scatter diagram matrix. By designating the arrangement of the scatter diagrams with the element selection dialog 4, the arrangement of a plurality of scatter diagrams constituting the scatter diagram matrix can be changed.

The element selection dialog 4 includes a preview 401 of the scatter diagram matrix, an element list 402 displaying a list of elements that can be used, a selection list 404 displaying a list of selected elements, an element replacement button 406, a priority replacement button 408 and an apply button 410.

The preview 401 displays a preview of the scatter diagram matrix. The preview 401 is numbered to indicate the priority of the elements. In the illustrated example, each item in the scatter diagram is numbered 1 to 5 to indicate the priority of the elements.

In the element list 402, a list of elements that can be used as the items of the scatter diagrams constituting the scatter diagram matrix is displayed. By selecting an element in the element list 402 and operating the element replacement button 406, the selected element can be included in the selection list 404. Further, by selecting an element in the selection list 404 and operating the element replacement button 406, the element can be removed from the selection list 404.

In the selection list 404, a list of elements selected as items in the scatter diagram is displayed. In the selection list 404, the selected elements and numbers indicating the priority of the selected element are displayed. In the initial state, the elements are arranged in the selection list 404 in the order of priority assigned based on the result of the principal component analysis.

In the selection list 404, the priority of the elements can be changed by selecting the element name displayed in the selection list 404 and operating the priority replacement button 408. The priority of the elements can be designated by pressing the apply button 220 after changing the selection list 404. Here, since the arrangement of the scatter diagrams in the scatter diagram matrix is determined by the priority of the elements, the arrangement of the scatter diagrams in the scatter diagram matrix can be designated by designating the priority of the elements.

For example, by setting the priority of Al to "2" and the priority of Fe to "1" in the selection list 404, Fe is set to the display position "1" and Al is set to the display position "2" in the scatter diagram matrix and the scatter diagrams are rearranged.

Information on the priority of elements set in the element selection dialog 4 (information on the arrangement of scatter diagrams) is stored in the storage section 124. For example, the display control section 118 may read out the priority information stored in the storage section 124 when the scatter diagram display device 100 is activated to reproduce the arrangement of the scatter diagrams.

Figure 10:
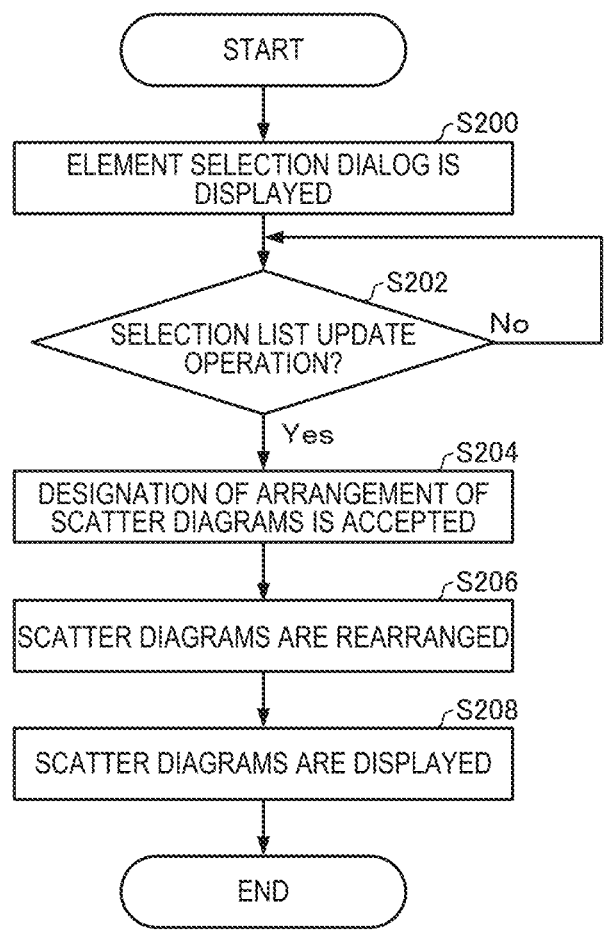
FIG. 10 is a flowchart illustrating an example of arrangement change processing.

FIG. 10 is a flowchart illustrating an example of arrangement change processing performed by the processing section 110 of the scatter diagram display device 100.

The display control section 118 displays the element selection dialog 4 illustrated in FIG. 9 on the display section 122 (S200). At this time, the elements are arranged in the selection list 404 in the order of priority assigned based on the result of the principal component analysis.

The display condition acceptance section 119 determines whether the user has performed the operation of changing the priority of an element in the selection list 404 (S202), and waits until the operation of changing the priority is performed (No in S202). For example, when the priority of an element is changed in the selection list 404 and the operation of pressing the apply button 410 is performed, it is determined that the operation of changing the priority, that is, the operation of changing the arrangement of the scatter diagrams is performed.

Where it is determined that the user has performed an operation of changing the priority of an element (Yes in S202), the display condition acceptance section 119 accepts the designation of the arrangement of the scatter diagrams (S204).

The display control section 118 rearranges the scatter diagrams so that the scatter diagrams have the designated arrangement in the scatter diagram matrix based on the priority of elements (S206) and displays the rearranged scatter diagrams on the display section 122 (S208). The processing section 110 ends the arrangement change processing after displaying the rearranged scatter diagrams on the display section 122.

3. EFFECTS

In the scatter diagram display device 100, a plurality of scatter diagrams is created based on a plurality of mapping data acquired by the analyzer main body 10, and a scatter diagram matrix in which the created plurality of scatter diagrams are arranged in a matrix is displayed on the display section 122. Further, the display condition acceptance section 119 accepts the designation of a display range of an item in each of the plurality of scatter diagrams, and the display control section 118 extracts all the scatter diagrams having the item for which the display range has been designated from the plurality of scatter diagrams and changes the display range of the item of the extracted scatter diagrams based on the designation of the display range.

Therefore, in the scatter diagram display device 100, the display range of the scatter diagrams constituting the scatter diagram matrix can be easily changed.

Further, since the display control section 118 extracts all the scatter diagrams having the item for which the display range has been designated from the plurality of scatter diagrams, by designating the display range of one item, it is possible to change collectively the display ranges of all the scatter diagrams including the item.

In the scatter diagram display device 100, the display control section 118 recreates the scatter diagrams so that the display range of the item of the extracted scatter diagrams is the designated display range. Therefore, in the scatter diagram display device 100, the display ranges of the scatter diagrams constituting the scatter diagrams matrix can be changed.

In the scatter diagram display device 100, the display condition acceptance section 119 accepts the designation of the display range of the designated item based on the operation of inputting the display range into the table 210 provided with the fields where the display range is designated for each item. Therefore, in the scatter diagram display device 100, the user can easily designate the display range.

In the scatter diagram display device 100, the display condition acceptance section 119 accepts the designation of the arrangement of the plurality of scatter diagrams constituting the scatter diagram matrix. Therefore, in the scatter diagram display device 100, the arrangement of the scatter diagrams in the scatter diagram matrix can be changed.

4. MODIFICATION EXAMPLES

Next, modification examples of the scatter diagram display device according to the embodiment of the invention will be described. Hereinafter, the features different from those of the above scatter diagram display device 100 will be described, and the explanation of the features that are the same as those of the scatter diagram display device 100 will be omitted.

4.1. First Modification Example

4.1.1. Operation Example 1

(1) Operation

Figure 11:
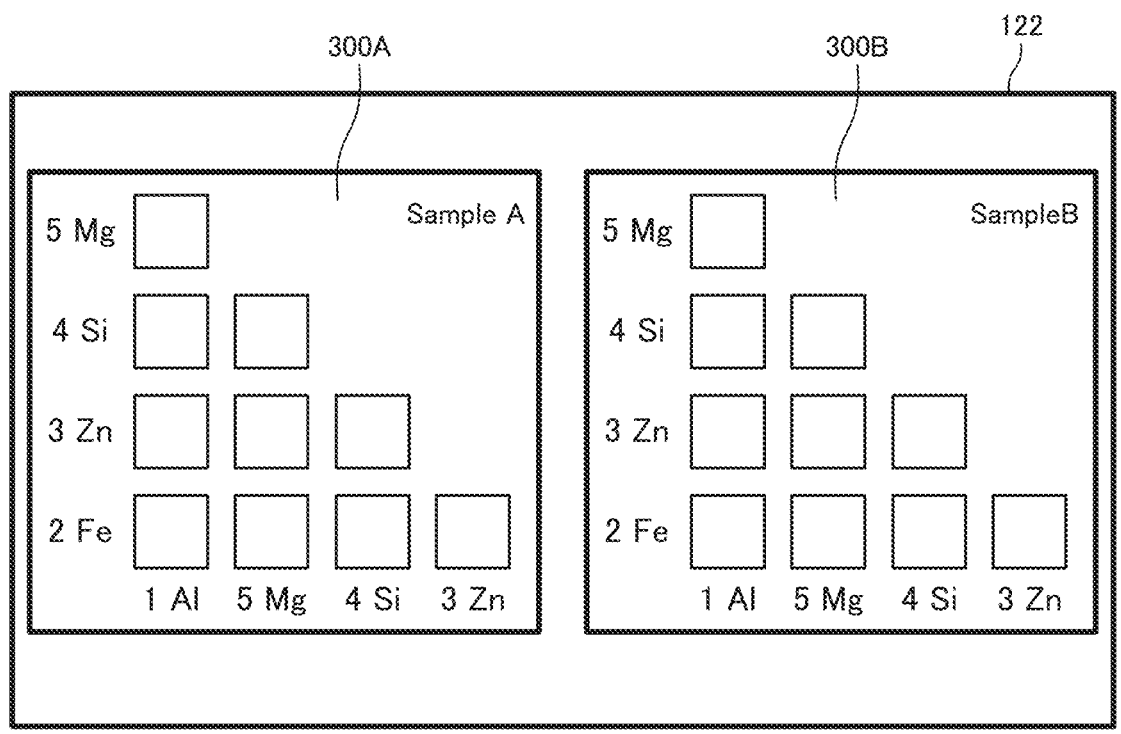
FIG. 11 is a diagram schematically illustrating two scatter diagram matrices.

FIG. 11 is a diagram schematically illustrating two scatter diagram matrices displayed on the display section 122.

As illustrated in FIG. 11, the display section 122 displays a window 300A and a window 300B for displaying the scatter diagram matrices. The scatter diagram matrix of a specimen A is displayed in the window 300A, and the scatter diagram matrix of a specimen B is displayed in the window 300B.

Here, when comparing the scatter diagram matrix of specimen A and the scatter diagram matrix of specimen B, where the arrangement of each scatter diagram is the same in the two scatter diagram matrices and the display ranges of the corresponding items are the same, the matrices are easy to compare.

Figure 12:
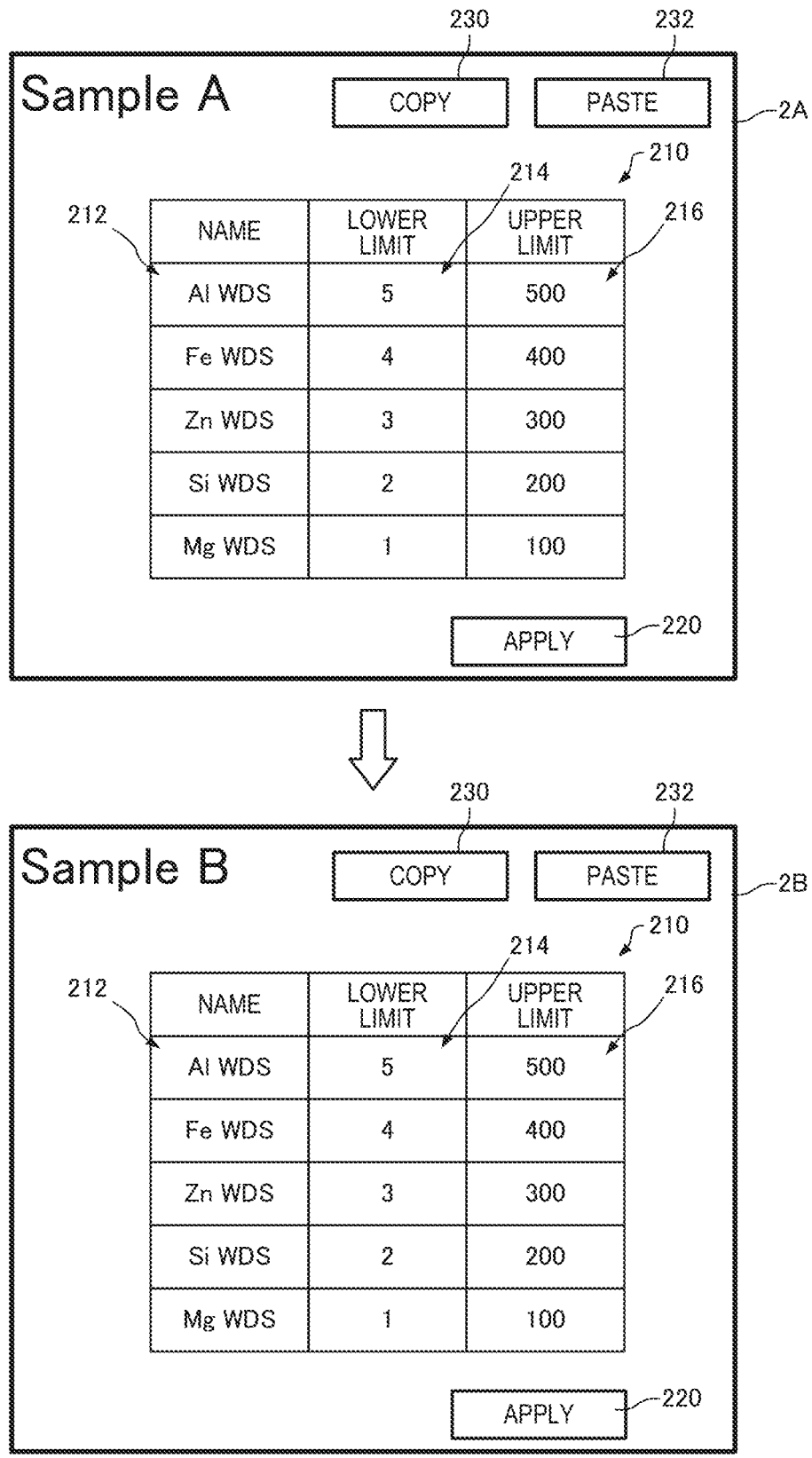
FIG. 12 is a diagram for explaining two display range designation dialogs.

FIG. 12 is a diagram for explaining a display range designation dialog 2A for the scatter diagram matrix displayed in the window 300A, and a display range designation dialog 2B for the scatter diagram matrix displayed in the window 300B.

In the scatter diagram display device 100, when a plurality of scatter diagram matrices is displayed on the display section 122, a plurality of display range designation dialogs is displayed in a one-to-one correspondence relationship with the displayed plurality of scatter diagram matrices. Here, two display range designation dialogs 2 (display range designation dialog 2A and display range designation dialog 2B) are displayed corresponding to the two scatter diagram matrices.

The display range designation dialog 2A and the display range designation dialog 2B include a copy button 230 and a paste button 232.

The user can copy all the contents inputted in the table 210 by performing the operation of pressing the copy button 230. Further, the user can input the contents copied to the table 210 by performing the operation of pressing the paste button 232.

These copy processing and paste processing may be applicable only to the lower limit field 214 and the upper limit field 216. In this case, the item field 212 may be changed by using the element selection dialog 4.

Also, the information obtained by the copy processing may be saved in a text file format.

(2) Processing

The display condition acceptance section 119 accepts the designation of the display range of the designated item based on the operation of copying the information input to the table 210 and the operation of pasting the copied information to another table.

For example, where the user performs the operation of pressing the copy button 230 in the table 210 of the display range designation dialog 2A by using the operation section 120, the display condition acceptance section 119 causes the storage section 124 to store all the values input in the table 210 of the display range designation dialog 2A.

Next, where the user performs the operation of pressing the paste button 232 in the table 210 of the display range designation dialog 2B by using the operation section 120, the display condition acceptance section 119 pastes the copied values stored in the storage section 124 into the table 210 of the display range designation dialog 2B.

Where the operation of pressing the apply button 220 of the display range designation dialog 2B is performed in this state, the processing section 110 performs the display range change processing illustrated in FIG. 8 described above.

As a result, the display ranges of each scatter diagram constituting the scatter diagram matrix of specimen B displayed in the window 300B illustrated in FIG. 11 can be the same as the display ranges of each scatter diagram constituting the scatter diagram matrix of the specimen A displayed in the window 300A.

4.1.2. Operation Example 2

(1) Operation

By performing the operation of pressing the copy button 230 with the item field 212 of the table 210 selected, the element name entered in the selected item field 212 can be copied. Further, by pressing the paste button 232 with the item field 212 of the table 210 selected, the element name copied to the selected item field 212 can be input.

By performing the operation of pressing the copy button 230 with the lower limit field 214 of the table 210 selected, the value input in the selected lower limit field 214 can be copied. Similarly, by performing the operation of pressing the copy button 230 with the upper limit field 216 of the table 210 selected, the value input to the selected upper limit field 216 can be copied.

By performing the operation of pressing the paste button 232 with the lower limit field 214 of the table 210 selected, the value copied to the selected lower limit field 214 can be input. Similarly, by performing the operation of pressing the paste button 232 with the upper limit field 216 of the table 210 selected, the value copied to the selected upper limit field 216 can be input.

Therefore, for example, first, the operation of pressing the copy button 230 is performed in a state where five item fields 212, five lower limit fields 214, and five upper limit fields 216 are selected in the display range designation dialog 2A. Next, the operation of pressing the paste button 232 is performed in a state where five item fields 212, five lower limit fields 214, and five upper limit fields 216 are selected in the display range designation dialog 2B. The contents input to the table 210 of the display range designation dialog 2B can thus be made the same as the contents input to the table 210 of the display range designation dialog 2A. As a result, the arrangement and the display range of each item of each scatter diagram of the scatter diagram matrix of the specimen B displayed in the window 300B can be made the same the display range of each item and the arrangement of each scatter diagram of the scatter diagram matrix of the specimen A displayed in the window 300A.

(2) Processing

The display condition acceptance section 119 accepts the designation of the display range of the designated item based on the operation of copying the information input to the table 210 and the operation of pasting the copied information to another table.

For example, where the user selects the lower limit field 214 and the upper limit field 216 of Al in the table 210 of the display range designation dialog 2A by using the operation section 120, and performs the operation of copying the values input to the lower limit field 214 and the upper limit field 216 of the selected Al (the operation of pressing the copy button 230), the display condition acceptance section 119 causes the storage section 124 to store the value of the lower limit field 214 and the value of the upper limit field 216 of Al.

Where the user next selects the lower limit field 214 and the upper limit field 216 of Al in the table 210 of the display range designation dialog 2B by using the operation section 120, and performs the operation of pasting the values copied to the lower limit field 214 and the upper limit field 216 of the selected Al (the operation of pressing the paste button 232), the display condition acceptance section 119 pastes the copied values stored in the storage section 124 into the lower limit field 214 and the upper limit field 216 of the selected Al.

Where the operation of pressing the apply button 220 of the display range designation dialog 2B is performed in this state, the processing section 110 performs the display range change processing illustrated in FIG. 8 described above.

As a result, the display range of the Al item of the scatter diagrams constituting the scatter diagram matrix of the specimen B displayed in the window 300B illustrated in FIG. 11 can be the same as the display range of the Al item of the scatter diagrams constituting the scatter diagram matrix of the specimen A displayed in the window 300A.

4.1.3. Effects

In the scatter diagram display device 100 according to the first modification example, the scatter diagram matrix of specimen A and the scatter diagram matrix of specimen B (another scatter diagram matrix) are displayed on the display section 122. Further, the display condition acceptance section 119 accepts the designation of the display range in the scatter diagram matrix of specimen A based on the operation of inputting the display range in the table 210 of the display range designation dialog 2A and accepts the designation of the display range in the scatter diagram matrix of specimen B based on the operation of inputting the display range in the table 210 (another table) of the display range designation dialog 2B.

Therefore, in the scatter diagram display device 100 according to the first modification example, the display conditions of the scatter diagram matrix of specimen A and the display conditions of the scatter diagram matrix of specimen B can be easily aligned. Therefore, it is possible to easily compare the scatter diagrams between the specimens.

4.1.4. Modification Example

Figure 13:
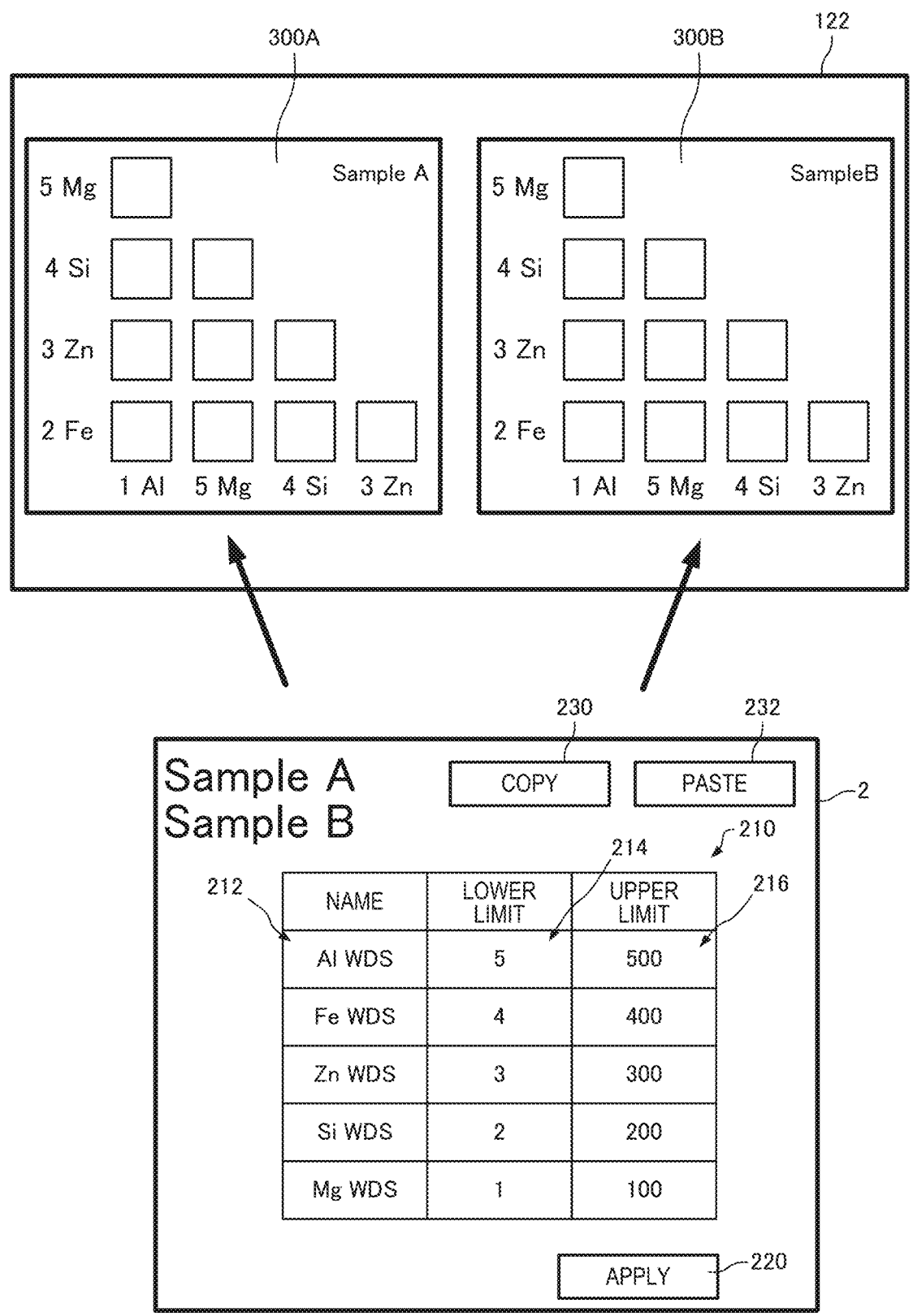
FIG. 13 is a diagram for explaining a case where a display range of two scatter diagram matrices is designated in one display range designation dialog.

FIG. 13 is a diagram for explaining a case where display ranges of two scatter diagram matrices are designated by one display range designation dialog 2.

In the example illustrated in FIG. 12, the display range of the scatter diagram matrix of specimen A was designated by the display range designation dialog 2A, and the display range of the scatter diagram matrix of specimen B was designated by the display range designation dialog 2B. Meanwhile, the display range of the scatter diagram matrix of specimen A and the display range of the scatter diagram matrix of specimen B may be designated by one display range designation dialog 2. In this case, since there is only one display range designation dialog 2, the same display range can be designated for two scatter diagram matrices.

4.2. Second Modification Example

In the first modification example, the display conditions of each scatter diagram of the two scatter diagram matrices were aligned by copying the values in table 210 of the display range designation dialog 2A and pasting the copied values to the table 210 of the display range designation dialog 2B.

Meanwhile, in the second modification example, the information in the table 210 of the display range designation dialog 2A (information on the lower limit value and the upper limit value of each item) is stored as a display condition setting file in the storage section 124, and the table 210 of the display range designation dialog 2B is set to the same conditions as in the display range designation dialog 2A by reading the display condition setting file stored in the storage section 124.

When reading the display condition setting file, only the lower limit value and upper limit value information may be read.

Here, the case where the display condition setting file of the scatter diagram matrix of specimen A is applied to the scatter diagram matrix of specimen B has been described, but it is also possible, for example, to create a display condition setting file of the scatter diagram matrix of specimen A in advance and apply the condition setting file created in advance to the scatter diagram matrix of specimen A.

4.3. Third Modification Example

In the above-described embodiment, as illustrated in FIG. 8, the scatter diagrams were recreated in order to change the display range. Meanwhile, the scatter diagrams may be enlarged or reduced in order to change the display range. That is, the display ranges of the scatter diagrams may be changed by image processing.

Figure 14:
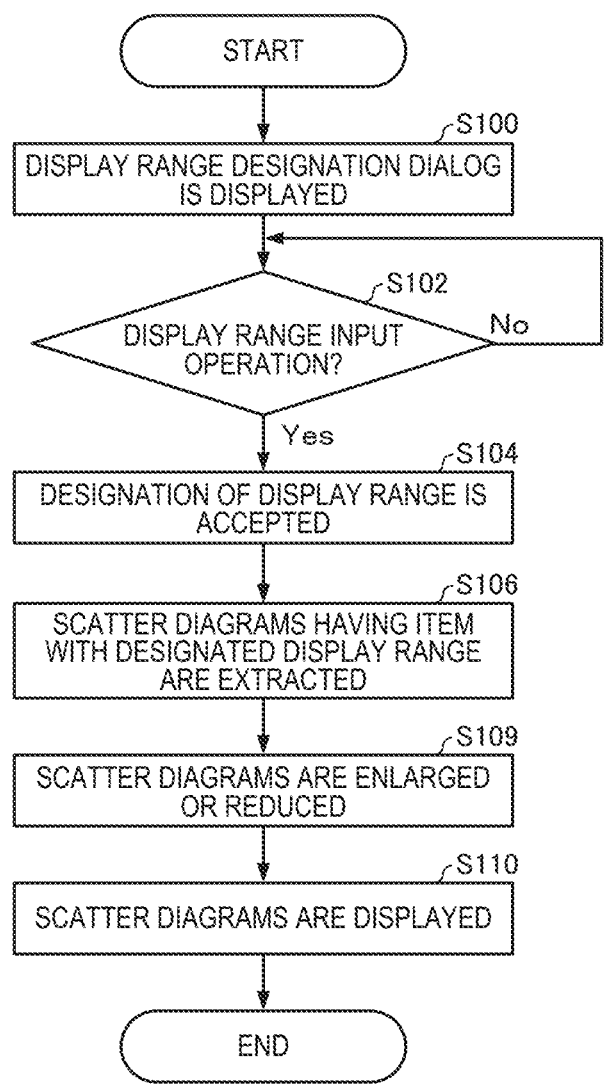
FIG. 14 is a flowchart illustrating a modification example of display range change processing.

FIG. 14 is a flowchart illustrating a modification example of the display range change processing of the processing section 110. The display range change processing illustrated in FIG. 8 and the display range change processing illustrated in FIG. 14 differ in that in the firmer, the processing S108 for recreating the scatter diagrams is performed, whereas in the latter, the processing S109 for enlarging or reducing the scatter diagrams is performed. Hereinafter, the features different from the example of the display range changing processing illustrated in FIG. 8 will be described, and the explanation of the same features will be omitted.

The display control section 118 extracts from the scatter diagrams matrix all the scatter diagrams having an element with the designated display range as an item, and then (after S106) enlarges or reduces the scatter diagrams so that the display range of the item in the extracted scatter diagrams becomes the designated display range (S109). The enlargement or reduction of the scatter diagrams is performed by image processing.

The display control section 118 updates each scatter diagram of the scatter diagram matrix to an enlarged or reduced scatter diagram and displays the updated scatter diagrams on the display section 122 (S110).

As an example of the operation of the scatter diagram display device 100 according to the third modification example, the operation will be explained in which the user inputs "20" to the lower limit field 214 and "200" to the upper limit field 216 of Al and inputs "0" to the lower limit field 214 and "300" to the upper limit field 216 of Zn in the display range designation dialog 2 in the state where the scatter diagram matrix illustrated in FIG. 6 and the display range designation dialog 2 illustrated in FIG. 7 are displayed.

When the above user's operation is performed, the display condition acceptance section 119 determines that the user has performed the operation of inputting the display ranges and accepts the designation of "20-200" as the display range of Al and the designation of "0-300" as the display range of Zn.

The display control section 118 extracts four scatter diagrams ((Al, Fe) scatter diagram, (Al, Zn) scatter diagram, (Al, Si) scatter diagram, (Al, Mg) scatter diagram) with Al as an item and four scatter diagrams ((Al, Zn) scatter diagram, (Mg, Zn) scatter diagram, (Si, Zn) scatter diagram, (Zn, Fe) scatter diagram) with Zn as an item from the scatter diagram matrix.

The display control section 118 enlarges the (Al, Fe) scatter diagram, (Al, Zn) scatter diagram, (Al, Si) scatter diagram, and (Al, Mg) scatter diagram in the horizontal direction so that the horizontal axes of the scatter diagrams are "20-200". Next, the display control section 118 reduces the (Al, Zn) scatter diagram, (Mg, Zn) scatter diagram, and (Si, Zn) scatter diagram in the vertical direction so that the vertical axes of the scatter diagrams are "0-300". Next, the display control section 118 reduces the (Zn, Fe) scatter diagram in the horizontal direction so that the horizontal axis of the scatter diagram is "0-300".

The display control section 118 replaces the extracted scatter diagrams with the enlarged or reduced scatter diagrams, updates the display of the scatter diagram matrix, and displays the updated scatter diagram matrix on the display section 122.

By the above processing, the display ranges of the scatter diagrams can be changed.

4.4. Fourth Modification Example

Figure 15:
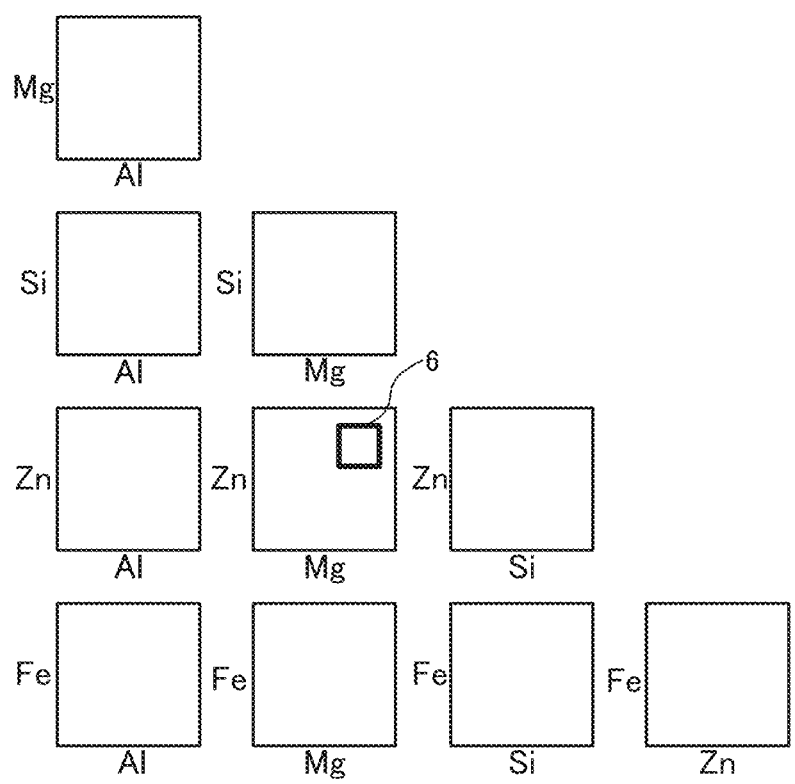
FIG. 15 is a diagram schematically illustrating a rubber band for designating a display range.

FIG. 15 is a diagram schematically illustrating a rubber band 6 for designating a display range.

In the above-described embodiment, the display range is changed by inputting values in the table 210 of the display range designation dialog 2, but as illustrated in FIG. 15, the display range may be designated by the rubber band 6 on the scatter diagrams.

For example, the rubber band 6 is displayed by dragging a mouse on the scatter diagram constituting the scatter diagram matrix, and the area on the scatter diagram is designated using the rubber band 6. As a result, the display range corresponding to the designated area is designated. By designating the display range by using the rubber band 6, the value of the lower limit field 214 and the value of the upper limit field 216 of the display range designation dialog 2 illustrated in FIG. 7 are changed to the values corresponding to the display range designated by the rubber band 6. In the illustrated example, the values of the lower limit field 214 and the upper limit field 216 of Mg and the values of the lower limit field 214 and the upper limit field 216 of Zn are changed. The display condition acceptance section 119 accepts the designation of the display range of the item (element) designated based on the operation of designating the display range by using the rubber band 6. The display condition acceptance section 119 may directly accept the display range designated by using the rubber band 6 without displaying the display range designation dialog 2.

4.5. Fifth Modification Example

In the above-described embodiment, the case where the scatter diagram constituting the scatter diagram matrix is a scatter diagram having the X-ray signal intensity as an item has been described, but the scatter diagram constituting the scatter diagram matrix may be a scatter diagram having an electronic signal intensity as an item.

For example, in the above-described embodiment, a scatter diagram is created based on the mapping data of X-ray signal intensity, but a scatter diagram may be created based on the mapping data of electronic signal intensity. For example, a scatter diagram may be created from the signal intensity data of each pixel of a secondary electron image or the signal intensity data of each pixel of a backscattered electron image.

4.6. Sixth Modification Example

For example, in the above-described embodiment, the example in which the surface analyzer 1000 is an electron probe microanalyzer (EPMA) has been described, but the surface analyzer according to the invention is not particularly limited as long as mapping data of X-ray signal intensity or mapping data of electron signal intensity can be acquired.

For example, the analyzer according to the invention may be an Auger electron microscope (AES), an X-ray photoelectron spectroscope, a scanning electron microscope equipped with an energy-dispersive X-ray spectrometer, or the like.

Further, for example, in the above-described embodiment, the case where the scatter diagram display device 100 is included in the surface analyzer 1000 has been described, but the scatter diagram display device according to the invention may not be included in the surface analyzer. The scatter diagram display device according to the invention may perform the processing of displaying the above-mentioned scatter diagrams, for example, by acquiring mapping data via an information storage medium or a network.

The above-described embodiments and modification examples are merely examples, and the invention is not limited thereto. For example, the embodiments and the modification examples can be combined as appropriate.

The invention is not limited to the above-described embodiment, and various modifications thereof are possible. For example, the invention includes configurations that are substantially the same as the configurations described in the embodiments. Substantially same configurations mean configurations having the same functions, methods and results, or configurations having the same objectives and effects as those of the configurations described in the embodiments, for example. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

The invention claimed is:

1. A scatter diagram display device that creates a plurality of scatter diagrams based on mapping data acquired by an analyzer and displays a scatter diagram matrix in which the created plurality of scatter diagrams is arranged in a matrix on a display section, the scatter diagram display device comprising:
    a display condition acceptance section that accepts a designation of a display range of an item in each of the plurality of scatter diagrams; and
    a display control section that extracts all scatter diagrams having the item whose display range has been designated from the plurality of scatter diagrams and changes the display range of the item in the extracted scatter diagrams based on the designation of the display range,
    wherein the analyzer is configured to scan a specimen with an electron probe and detect X-rays generated from the specimen in response to the scanning;
    wherein the mapping data are obtained for each element and include information on positions on the specimen and an X-ray intensity at each of the positions;
    wherein each of the plurality of scatter diagrams has two axes which represent signal intensity of elements which are different from each other;
    wherein, in the scatter diagram matrix, the plurality of scatter diagrams created by combining elements which are different from each other are arranged;
    wherein the display condition acceptance section is further configured to accept a lower limit value and an upper limit value of signal intensity of elements, as the designation of the display range of the item in each of the plurality of scatter diagrams; and
    wherein the display control section is further configured to extract all scatter diagrams having an axis representing signal intensity of a designated element from the plurality of scatter diagrams, and to change a range of the axis representing signal intensity of the designated element in the extracted scatter diagrams to have the designated lower and upper limit values.

2. The scatter diagram display device according to claim 1, wherein
    the display control section recreates the extracted scatter diagrams so that the item in the extracted scatter diagrams has the designated display range.

3. The scatter diagram display device according to claim 1, wherein
    the display control section enlarges or reduces the extracted scatter diagrams so that the item in the extracted scatter diagrams has the designated display range.

4. The scatter diagram display device according to claim 1, wherein
    the display condition acceptance section accepts the designation of the display range of the item based on an operation for inputting the display range into a table provided with fields for designating the display range for each item.

5. The scatter diagram display device according to claim 4, wherein
    the scatter diagram matrix and another scatter diagram matrix are displayed on the display section, and
    the display condition acceptance section
    accepts the designation of the display range in the scatter diagram matrix based on an operation for inputting the display range into the table, and
    accepts the designation of the display range in the other scatter diagram matrix based on an operation for inputting the display range into another table.

6. The scatter diagram display device according to claim 1, wherein
    the display condition acceptance section uses a rubber band for designating an area on the scatter diagram and accepts the designation of the display range of the item based on an operation of designating the display range.

7. The scatter diagram display device according to claim 1, further comprising:
    a storage section that stores information on the display ranges.

8. The scatter diagram display device according to claim 7, wherein
    the display condition acceptance section reads the information on the display range stored in the storage section and accepts the designation of the display range.

9. The scatter diagram display device according to claim 1, wherein
    the display condition acceptance section accepts a designation of an arrangement of the plurality of scatter diagrams constituting the scatter diagram matrix.

10. A scatter diagram display method for creating a plurality of scatter diagrams based on mapping data acquired by an analyzer and displaying a scatter diagram matrix in which the created plurality of scatter diagrams is arranged in a matrix on a display section, the scatter diagram display method comprising:
    accepting a designation of a display range of an item in each of the plurality of scatter diagrams including accepting a lower limit value and an upper limit value of signal intensity of elements;
    scanning a specimen with an electron probe and detecting an X-ray generated from the specimen in response to the scanning;
    obtaining the mapping data for each element and including information on positions on the specimen and an X-ray intensity at each of the positions; and
    extracting all scatter diagrams having the item whose display range has been designated from the plurality of scatter diagrams and changing the display range of the item in the extracted scatter diagrams based on the designation of the display range including extracting all scatter diagrams having an axis representing signal intensity of a designated element from the plurality of scatter diagrams, and changing a range of the axis representing signal intensity of the designated element in the extracted scatter diagrams to have the designated lower and upper limit values,
    wherein:
    each of the plurality of scatter diagrams has two axes which represent signal intensity of elements which are different from each other; and
    in the scatter diagram matrix, the plurality of scatter diagrams created by combining elements which are different from each other are arranged.

11. An analyzer comprising the scatter diagram display device according to claim 1.

* * * * *